US012618743B2

(12) United States Patent
Heo et al.

(10) Patent No.: US 12,618,743 B2
(45) Date of Patent: May 5, 2026

(54) CARTRIDGE FOR LEAKAGE DETECTION SENSOR

(71) Applicants: AUTOSENSORKOREA CO., LTD., Suwon-si (KR); Ji Hyeon Heo, Suwon-si (KR); Sang Hyun Choi, Suwon-si (KR)

(72) Inventors: Ji Hyeon Heo, Suwon-si (KR); Sang Hyun Choi, Suwon-si (KR)

(73) Assignees: Ji Hyeon Heo, Suwon-si (KR); Sang Hyun Choi, Suwon-si (KR); AUTOSENSORKOREA CO., LTD., Suwon-si (KR)

( * ) Notice: Subject to any disclaimer, the term of this patent is extended or adjusted under 35 U.S.C. 154(b) by 340 days.

(21) Appl. No.: 18/360,906

(22) Filed: Jul. 28, 2023

(65) Prior Publication Data

US 2024/0183742 A1 Jun. 6, 2024

(30) Foreign Application Priority Data

Dec. 1, 2022 (KR) ......................... 10-2022-0165575

(51) Int. Cl.
G01M 3/38 (2006.01)
G01D 11/24 (2006.01)
(52) U.S. Cl.
CPC .............. G01M 3/38 (2013.01); G01D 11/245 (2013.01)
(58) Field of Classification Search
CPC .......... G01M 3/20; G01M 3/38; G01D 11/24; G01D 11/245
See application file for complete search history.

(56) References Cited

FOREIGN PATENT DOCUMENTS

| | | | | | |
|---|---|---|---|---|---|
| JP | 2004294164 | A | 10/2004 | | |
| JP | 2005156195 | A | * | 6/2005 | ........... G01M 3/042 |
| JP | 2009133861 | A | | 6/2009 | |
| JP | 2020056660 | A | * | 4/2020 | |
| JP | 2021012085 | A | * | 2/2021 | |
| KR | 101938098 | B1 | | 1/2019 | |
| KR | 101965866 | B1 | | 4/2019 | |
| KR | 102029359 | B1 | | 10/2019 | |

OTHER PUBLICATIONS

Machine translation of JP2005156195 A (Year: 2005).*
Machine translation of JP 2020056660 A (Year: 220).*
Machine translation of JP 2021012085 A (Year: 2021).*

* cited by examiner

*Primary Examiner* — Nathaniel J Kolb
(74) *Attorney, Agent, or Firm* — NKL Law; Jae Youn Kim

(57) ABSTRACT

Proposed is a cartridge for a leak detection sensor. The cartridge includes a housing having an inner side thereof provided with a mounting space portion in which a reaction material is mounted, the housing having a plurality of fluid moving grooves in which a leaked oil is capable of being moved toward the reaction material and which is formed around an opening portion of a lower portion of the housing by a predetermined distance. Furthermore, the cartridge includes the reaction material being an opaque material, the reaction material being configured to be converted to a transparent state when the reaction material absorbs oil and reacts with an absorbed oil, and includes a separation prevention plate mounted by being fitted into the opening portion of the housing, the separation prevention plate preventing a separation of the reaction material that is mounted by being fitted into the fluid moving grooves.

5 Claims, 5 Drawing Sheets

1                 1

CARTRIDGE FOR LEAKAGE DETECTION SENSOR

CROSS REFERENCE TO RELATED APPLICATION

The present application claims priority to Korean Patent Application No. 10-2022-0165575, filed Dec. 1, 2022, the entire contents of which are incorporated herein for all purposes by this reference.

BACKGROUND OF THE INVENTION

Field of the Invention

The present disclosure relates to a cartridge for a leak detection sensor. More particularly, the present disclosure relates to a cartridge for a leak detection sensor, the entire of the cartridge being capable of being conveniently replaced and mounted at the leak detection sensor after leak detection is performed, the cartridge being configured such that the cartridge is in an opaque state when oil is not absorbed to the cartridge and the cartridge is converted to a transparent state when the cartridge absorbs oil and reacts with the absorbed oil so that leak detection is capable of being performed, and the cartridge being capable of being used by replacing a reaction material only.

Description of the Related Art

Generally, various types of leak sensors for detecting a water leakage and an oil leakage are used in a water leakage situation and an oil leakage situation. As representative leak sensors, a cable-type leak sensor, a band-type leak sensor, and a module-type leak sensor are used.

The cable-type leak sensor is a leak detection sensor which detects the exposure of various liquids (water, oil, and so on) and which accurately and rapidly informs of a point where a liquid leakage occurs. The water leakage and the oil leakage may be checked by detecting a potential difference of an electric current that flows along a conducting wire, the potential difference being generated by a resistance of water or oil that are leaked, and the potential difference can be detected using a detection line.

In such a band-type leak detection sensor, when water contacts an electric wire while a current flows through the electric wire, a resistance value of the electric wire is changed, so that whether a water leakage occurs is capable of being detected by checking the resistance value that is changed.

Such a band-type leak detection sensor can detect a water leakage in a large area at low costs and is easily mounted. However, there is a problem that the band-type leak detection sensor is required to be replaced after a single use.

Meanwhile, in the module-type leak sensor, photo sensors (a light-receiving portion and a light-emitting portion) are positioned inside a plastic casing. Furthermore, a beam of the light-emitting portion is received by the light-receiving portion when liquid is not detected, but the beam does not go to the light-receiving portion due to a change of a refractive index when the liquid is detected by the beam of the light-emitting portion, so that a water leakage is detected on the basis of a received state of light.

Such a module-type leak sensor can detect a change in the amount of light emitted by the light emitting portion, the change being caused by a leaked liquid, so that whether a leakage occurs is capable of being easily and conveniently measured. However, there is a disadvantage that the module-type leak sensor cannot be used only for detecting a leakage of specific liquid since the module-type leak sensor is configured to detect the occurrence of a leakage of all kinds of liquids.

DOCUMENT OF RELATED ART (Patent Document 1) Korean Patent No. 10-2029359
(Patent Document 2) Japanese Patent Application Publication No. 2004-294164
(Patent Document 3) Japanese Patent Application Publication No. 2009-133861
(Patent Document 4) Korean Patent No. 10-1965866
(Patent Document 5) Korean Patent No. 10-1938098

SUMMARY OF THE INVENTION

Accordingly, the present disclosure has been made keeping in mind the above problems occurring in the related art, and an objective of the present disclosure is to provide a cartridge for a leak detection sensor, the cartridge solving disadvantages of a band-type leak detection sensor and a module-type leak sensor, the cartridge being configured to be used by only replacing a reaction material which is capable of being conveniently replaced and mounted and which is in an opaque state when oil is not absorbed to the reaction material and which is in a transparent state when the reaction material absorbs oil and reacts with the absorbed oil at the same time so that leak detection is capable of being performed, or the cartridge being configured such that the entirety of the cartridge in which a reaction material reacting with only a specific liquid is capable of being conveniently replaced and mounted at a leak detection sensor module.

In order to achieve the above objective, according to the present disclosure, there is provided a cartridge for a leak detection sensor, the cartridge including: a housing having an inner side thereof provided with a mounting space portion in which a reaction material is mounted, the housing having a plurality of fluid moving grooves in which a leaked oil is capable of being moved toward the reaction material and which is formed around an opening portion of a lower portion of the housing by a predetermined distance; the reaction material inserted into the fluid moving grooves, the reaction material being an opaque material, and the reaction material being configured to be converted to a transparent state when the reaction material absorbs oil and reacts with an absorbed oil; and a separation prevention plate mounted by being fitted into the opening portion of the housing, the separation prevention plate preventing a separation of the reaction material that is mounted by being fitted into the fluid moving grooves.

According to the present disclosure, the separation prevention plate may have a flat plate shape, and may have a plurality of through-holes at a predetermined distance.

According to the present disclosure, locking steps may be formed inside opposite sides of the housing with respect to the fluid moving grooves, thereby preventing a separation of the separation prevention plate.

According to the present disclosure, the reaction material may be molded by pressing powder.

According to the present disclosure, the reaction material may be configured such that the reaction material is molded by pressing powder and the reaction material does not react with any liquid except oil, may be in an opaque state when the oil is not absorbed to the reaction material, may be converted into a transparent state when the oil is absorbed to the reaction material and the reaction material reacts with an absorbed oil, thereby being used for leak detection since the amount of light emitted from a light-emitting portion and received is changed by the reaction material.

According to the present disclosure, there is an effect that the cartridge is used by only replacing the reaction material which is capable of being conveniently replaced and mounted and which is in the opaque state when oil is not absorbed to the reaction material and which is converted to the transparent state when the reaction material absorbs oil and reacts with the absorbed oil so that the leak detection is capable of being performed, or the cartridge is configured such that the entire of the cartridge in which the reaction material reacting with only a specific liquid is capable of being conveniently replaced and mounted at the leak detection sensor module.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, an exemplary embodiment of the present disclosure will be described with reference to the accompanying drawings.

Figure 2:
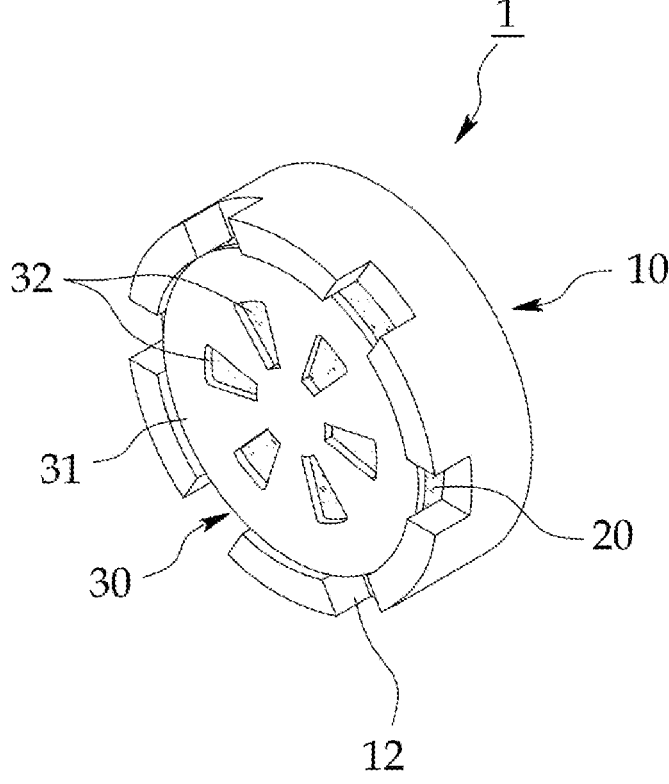
FIG. 2 is a perspective view illustrating a structure of the cartridge for the leak detection sensor in which the technology of the present disclosure is applied.
Figure 3:
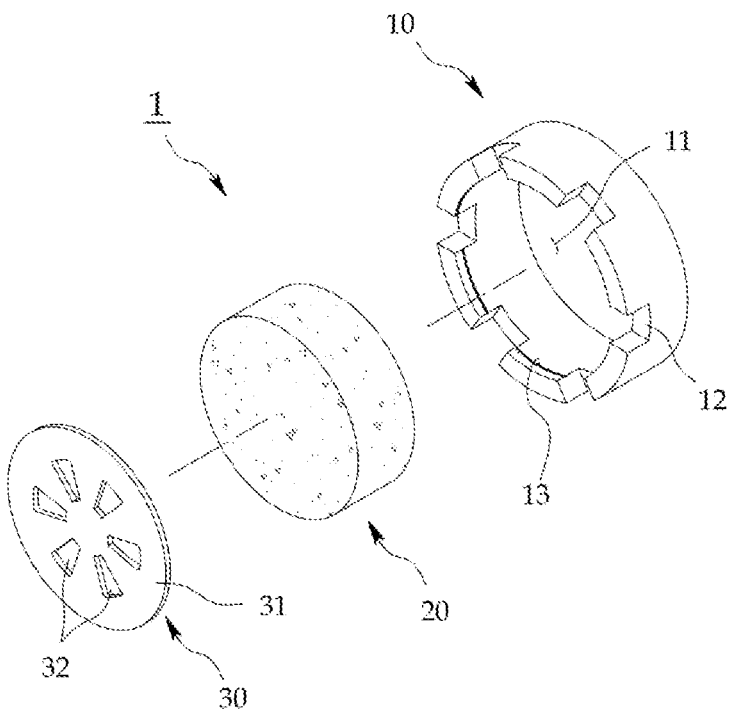
FIG. 3 is an exploded perspective view illustrating the structure of the cartridge for the leak detection sensor in which the technology of the present disclosure is applied.
Figure 4:
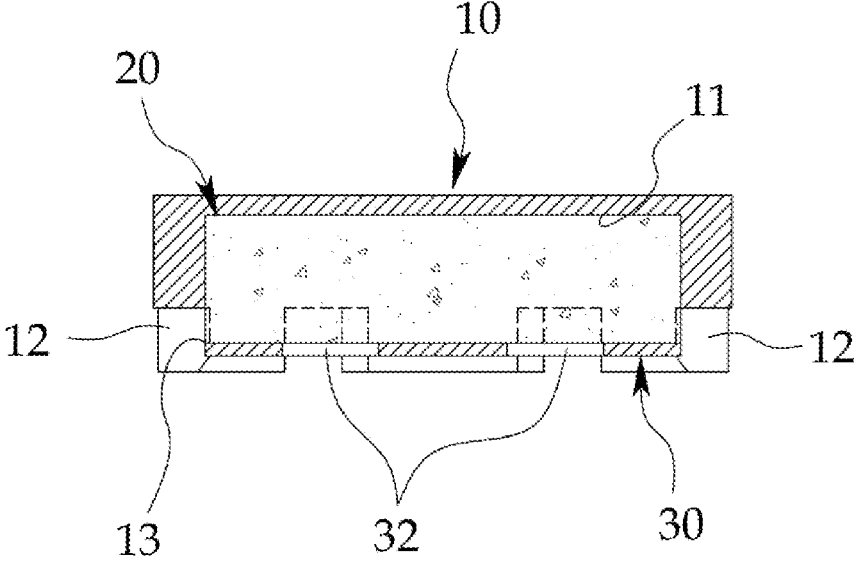
FIG. 4 is a cross-sectional view illustrating the structure of the cartridge for the leak detection sensor in which the technology of the present disclosure is applied.

The attached drawing FIG. 2 is a perspective view illustrating a structure of a cartridge for a leak detection sensor in which the technology of the present disclosure is applied, FIG. 3 is an exploded perspective view illustrating the structure of the cartridge for the leak detection sensor in which the technology of the present disclosure is applied, and FIG. 4 is a cross-sectional view illustrating the structure of the cartridge for the leak detection sensor in which the technology of the present disclosure is applied. According to the present disclosure, a cartridge 1 for a leak detection sensor includes a housing 10 capable of being mounted on or demounted from a leak detection sensor module, a reaction material 20 inserted and mounted inside the housing 10, and a separation prevention plate 30 preventing the reaction material 20 mounted in the housing 10 from being separated.

In the housing 10, a mounting space portion 11 in which the reaction material 20 is mounted is formed inside the housing 10, and a plurality of fluid moving grooves 12 in which a leaked oil is capable of being moved toward the reaction material 20 is formed around an opening portion of a lower portion of the housing 10 by a predetermined distance.

Meanwhile, locking steps 13 are formed inside opposite sides of the housing 10 with respect to the fluid moving grooves 12, thereby preventing the separation prevention plate 30 from being separated.

The reaction material 20 is molded by pressing powder, and does not react with any liquid except oil. Furthermore, the reaction material 20 is in an opaque state when oil is not absorbed to the reaction material 20, and is changed into a transparent state when the oil is absorbed to the reaction material 20 and at the same time the reaction material 20 reacts with the absorbed oil. Therefore, the reaction material 20 is used for the leak detection since the amount of light emitted from a light-emitting portion and received is changed by the reaction material 20.

As a molding method, a raw material powder for manufacturing the reaction material 20 is inserted into a container, and the raw material powder is pressed at a high-pressure and is molded. At this time, when the raw material powder is heated to a predetermined temperature, the molding of the raw material powder is easily performed.

As the reaction material 20, a powder-type aerosol is used, and the reaction material 20 is molded by pressing powder. The molding is performed so that the reaction material 20 has a shape, thereby allowing the reaction material 20 to be easily transported and stored.

The separation prevention plate 30 has a structure in which a plurality of through-holes 32 is formed in a plate 31 by a predetermined distance so that the leaked oil is capable of being easily absorbed to the reaction material 20, in which the plate 31 has a flat plate shape and is formed of a metal material.

Among metals, it is preferable that a metal that does not rust is used for the metal material which is used in the manufacturing of the separation prevention plate 30. Furthermore, since the metal used in the manufacturing of the separation prevention plate 30 does not react with oil, stability of the separation prevention plate 30 may be realized and occurrence of air may be prevented when the separation prevention plate 30 is mounted on a sensor.

Figure 1:
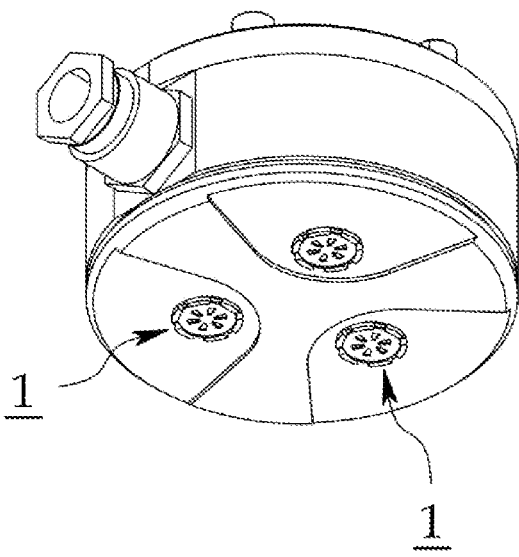
FIG. 1 is an installation state view illustrating an installation state of a cartridge for a leak detection sensor of the present disclosure.

In the use of the cartridge 1 as illustrated in FIG. 1, the cartridge 1 of the present disclosure is inserted and mounted in a bottom surface of the leak detection sensor, and the cartridge 1 of the present disclosure has a structure that facilitates the cartridge 1 to be mounted and demounted easily.

Figure 5:
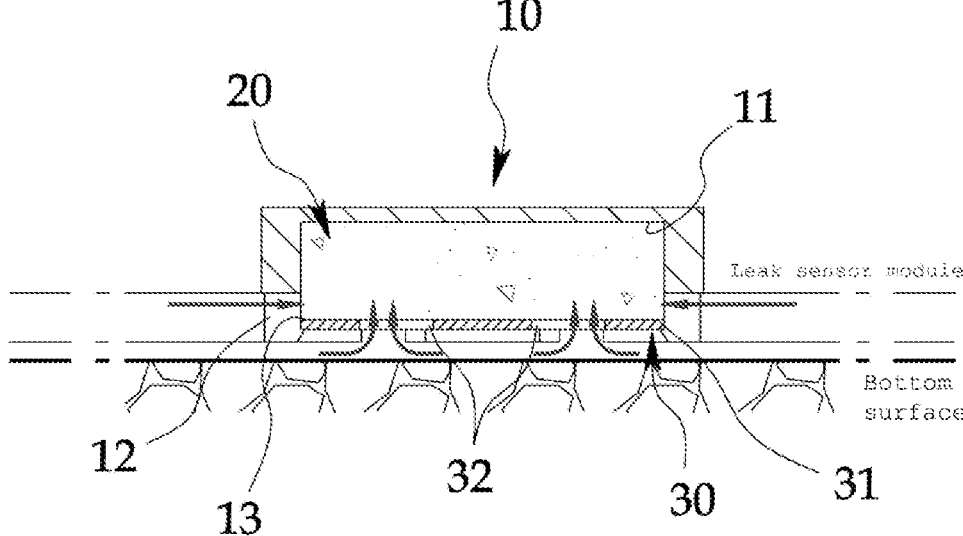
FIG. 5 is a cross-sectional view illustrating a use state of the cartridge for the leak detection sensor in which the technology of the present disclosure is applied.

In the use of the cartridge 1 as illustrated in FIG. 1, the cartridge 1 of the present disclosure is mounted at the bottom surface of the leak detection sensor in a detachable manner. As illustrated in FIG. 5, in the present disclosure, the leaked oil is absorbed to the reaction material 20 through a lower portion and a side surface of the housing 10. That is, the leaked oil is absorbed to the reaction material 20 through the through-holes 32 of the separation prevention plate 30 formed at the bottom surface of the housing 10, and is adsorbed to the reaction material 20 through the fluid moving grooves 12 formed at the side surface of the housing 10.

When oil is not absorbed to the reaction material 20, the reaction material 20 is in the opaque state, and light transmitted from the light-emitting portion which is mounted at the sensor and which is configured to emit light is blocked. Since the light is blocked, the light receiving-portion cannot detect the light that is blocked, and the light-receiving portion cannot measure the amount of light, so that it is determined that no oil leakage has occurred.

However, in a state in which a leaked oil is absorbed to the reaction material 20 and the reaction material 20 react with the leaked oil, leak detection is capable of being performed. That is, in a state in which the reaction material 20 is changed to the transparent state, light emitted from the light-emitting portion is refracted by oil and the amount of light is checked, thereby performing the leak detection.

According to the present disclosure, convenience in that the reaction material 20 can be easily and conveniently replaced and mounted or the entire cartridge 1 can be replaced.

Meanwhile, in an embodiment of the present disclosure, it is described that the reaction material 20 is in the opaque state and the state of the reaction material 20 is converted to the transparent state when the reaction material 20 absorbs and reacts with oil. However, a configuration of the reaction material 20 may be changed, and the reaction material 20 may be used such that the reaction material 20 is in the transparent state when oil is not absorbed to the reaction material 20 and the state of the reaction material 20 is changed to the opaque state when the reaction material 20 absorbs and reacts with the oil.

What is claimed is:

1. A cartridge for a leak detection sensor, the cartridge comprising:

a reaction material;

a housing including a mounting space portion inside thereof and an opening portion disposed at a lower portion of the housing, the reaction material being mounted in the mounting space portion, the housing having a plurality of openings configured to allow a leaked oil to flow toward the reaction material, and the plurality of openings being disposed around the opening portion by a predetermined distance of space between each of the plurality of openings; and a separation prevention plate being disposed at the opening portion of the housing, the separation prevention plate being configured to prevent separation of the reaction material from the mounting space portion, wherein locking steps are disposed inside the housing and disposed at opposite sides with respect to the plurality of openings, thereby preventing a separation of the separation prevention plate from the opening portion of the housing.

2. The cartridge of claim 1, wherein the separation prevention plate has a flat plate shape, and has a plurality of through-holes at a predetermined distance of space between each of the plurality of through-holes.

3. The cartridge of claim 1, wherein the reaction material is configured to be in a transparent state when oil is not absorbed by the reaction material, and is configured to be converted to an opaque state when the reaction material absorbs the oil and reacts with the absorbed oil.

4. The cartridge of claim 1, wherein the reaction material is configured to be in an opaque state when oil is not absorbed by the reaction material, and is configured to be converted to a transparent state when the reaction material absorbs the oil and reacts with the absorbed oil.

5. A cartridge for a leak detection sensor, the cartridge comprising:

a reaction material;

a housing including a mounting space portion inside thereof and an opening portion disposed at a lower portion of the housing, the reaction material being mounted in the mounting space portion, the housing having a plurality of openings configured to allow a leaked oil to flow toward the reaction material, and the plurality of openings being disposed around the opening portion by a predetermined distance of space between each of the plurality of opening; and a separation prevention plate being disposed at the opening portion of the housing, the separation prevention plate being configured to prevent a separation of the reaction material from the mounting space portion, wherein the reaction material includes powder;

wherein locking steps are disposed inside the housing and disposed at opposite sides with respect to the plurality of openings, thereby preventing a separation of the separation prevention plate from the opening portion of the housing.

* * * * *